US006574635B2

(12) United States Patent
Stauber et al.

(10) Patent No.: US 6,574,635 B2
(45) Date of Patent: Jun. 3, 2003

(54) APPLICATION INSTANTIATION BASED UPON ATTRIBUTES AND VALUES STORED IN A META DATA REPOSITORY, INCLUDING TIERING OF APPLICATION LAYERS OBJECTS AND COMPONENTS

(75) Inventors: Christopher Stauber, Castro Valley, CA (US); Jesse Ambrose, San Jose, CA (US); Thomas M. Rothwein, San Jose, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/261,771

(22) Filed: Mar. 3, 1999

(65) Prior Publication Data

US 2002/0161734 A1 Oct. 31, 2002

(51) Int. Cl.[7] .............................................. G06F 17/30
(52) U.S. Cl. ...................................... 707/103 R; 707/1
(58) Field of Search .............................. 707/1, 10, 103, 707/9, 101; 345/329, 330–332, 594, 663, 678; 709/225

(56) References Cited

U.S. PATENT DOCUMENTS

| 5,193,185 A | | 3/1993 | Lanter | 395/600 |
|---|---|---|---|---|
| 5,355,474 A | | 10/1994 | Thuraisngham et al. | 395/600 |
| 5,414,812 A | * | 5/1995 | Filip et al. | 707/103 |
| 5,432,925 A | * | 7/1995 | Abraham et al. | 709/316 |
| 5,588,150 A | | 12/1996 | Lin et al. | 395/601 |
| 5,590,321 A | | 12/1996 | Lin et al. | 395/610 |
| 5,612,865 A | | 3/1997 | Dasgupta | 364/184 |
| 5,857,197 A | * | 1/1999 | Mullins | 707/102 |
| 5,915,253 A | | 6/1999 | Christiansen | 707/103 |
| 5,920,870 A | * | 7/1999 | Briscoe et al. | 707/103 |
| 5,970,490 A | * | 10/1999 | Morgenstern | 707/10 |
| 6,012,067 A | * | 1/2000 | Sarkar | 703/3 |
| 6,018,627 A | * | 1/2000 | Iyengar et al. | 717/103 |
| 6,044,403 A | * | 3/2000 | Gersberg et al. | 709/225 |
| 6,122,627 A | * | 9/2000 | Carey et al. | 707/4 |
| 6,336,118 B1 | * | 1/2002 | Hammond | 707/103 Y |
| 6,397,203 B1 | * | 5/2002 | Hembry | 707/2 |

* cited by examiner

Primary Examiner—Vincent Millin
Assistant Examiner—Ella Colbert
(74) Attorney, Agent, or Firm—James Soong; Perkins Coie LLP

(57) ABSTRACT

Instantiation of tiered software applications running on an Internet or Intranet computer system, including a method of instantiation and a program product for instantiation. The method, and program product are particularly useful in instantiation of multi-tiered applications having a user interface tier on the client, browser, or remote computer, from a meta data repository containing attributes and values of the attributes.

8 Claims, 4 Drawing Sheets

| Properties | ☒ |
|---|---|
| Applet [Account Entry Applet] | |
| Alphabetic  Categorized | |
| Associate Applet | |
| Background Bitmap. | |
| Background Bitmap Style | |
| Business Component | Account |
| Class | CSS FrameBase |
| Comments | |
| Height | 1 |
| Help Identifier | ID_APPLET_ACCOUNT_ENTRY |
| Inactive | FALSE |
| Insert Applet | |
| Insert Position | |
| Mail Address Field | |
| Mail Template | |
| Name | Account Entry Applet |
| No Delete | FALSE |
| No Insert | FALSE |
| No Merge | FALSE |
| No Update | FALSE |
| Popup Dimension | |
| Query Applet | |
| Scripted | FALSE |
| Search Specification | |
| Title | Account |
| Type | Standard |
| Width | 2 |

*FIG. 4*

APPLICATION INSTANTIATION BASED UPON ATTRIBUTES AND VALUES STORED IN A META DATA REPOSITORY, INCLUDING TIERING OF APPLICATION LAYERS OBJECTS AND COMPONENTS

FIELD OF THE INVENTION

Our invention relates to instantiation of software applications running on a computer. More particularly, our invention relates to instantiation of these applications, especially multi-tiered applications, from a meta data repository containing attributes and values of the attributes. A further aspect of our application is an n-tiered software application for Internet and/or Intranet deployment where the tiers pass data and commands between tiers.

BACKGROUND OF THE INVENTION

Occasionally, revolutionary technology advances are made that redefine how business is conducted. Less than five years ago, one of these leaps occurred in the form of the Internet. Although the Internet itself had been in existence for decades, the addition of a powerful catalyst application, the World Wide Web, started a chain reaction. The result is a new software platform that unites companies, organizations, and individuals previously separated by geography, language, and culture into a virtually connected, electronic global village. This platform has dramatically reshaped-and will continue to affect-the nature of all computing, information exchange, and commerce.

As we move from the latter half of the 1990s and into 2000, the Internet is the driving impetus behind almost all new technology and application developments. As much as it has already changed the software industry, yet to come are the numerous solutions that will dramatically affect businesses and consumers worldwide. Organizations that take advantage of this new and advanced computing paradigm and utilize Internet-based software solutions will gain significant competitive advantage.

The greatest single effect the Internet will have is the creation of a global information architecture. This new infrastructure, based upon the TCP/IP protocol, is not limited to the public network currently known as the Internet. It also works for any other IP-based network environment, including private internal networks known as intranets.

A new generation of advanced, object-oriented, client/server application software will be one to take greatest advantage of this new Internet-enabled architecture. The promise of a totally open, extensible, and dynamically modifiable environment is something that the current generation of fourth-generation language-based "client/server" solutions cannot provide. Proprietary and inflexible fourth-generation languages (4GLs) are the primary reasons that today's generation of client/server applications have failed to deliver upon their original promise. This new object-oriented, Internet-enabled architecture does not suffer from such limitations. It will enable the creation of a large new industry in their place, driving the client/server re-engineering revolution.

Since the late 1980s, client/server computing began to transform the corporate computing model. Client/server architecture provided unprecedented flexibility to groups, departments, and organizations within large corporations by taking advantage of internal networks and making centralized information available to everyone in a readily accessible from across the enterprise. This new model was directly pitted against the mainframe-based, centralized computing model of the past. Just as most of the monolithic, data-specific, mainframe-based applications didn't survive the evolution to client/server, the new demands required by the Internet as a computing platform will eliminate many client/server applications from making the transition to global distributed computing.

The typical client/server product has a two-tiered architecture with a client application that communicates with a back-end relational database across a physical network.

Global enterprise computing imposes requirements on application software that exceed the capabilities of traditional client/server technologies. Requirements such as the ability to support heterogeneous environments, multiple languages, multimedia, the Internet and corporate intranets, and rapid application deployment and upgrades have exceeded the capabilities of 4GL client/server programming environments. In addition, a modem application software company must have a product architecture that supports rapid evolution.

Industry analysts agree that the client/server industry is rapidly transitioning to provide support for the Internet. As such, true distributed computing will for the first time be practical.

Where no one vendor was successful in creating a ubiquitous networking protocol standard, the powerful pressure exerted by the Internet resulted in the widespread adoption of TCP/IP as a network protocol across all computing platforms and network devices. This standardization has led to the very rapid rise of internal corporate intranets. Using the identical technology that supports connectivity across the public Internet, any company with an IP-compatible network can distribute information and Web-based applications throughout the enterprise. They can do it simply, at a low cost, and with a high probability of success.

Additionally, if a business is prepared to program at the level of TCP/IP (through a socket interface), they can create vastly more sophisticated applications at low risk and low cost. The world of distributed computing and applications has taken a dramatically positive upward turn because of the Internet.

However, this does present a challenge. Global enterprise computing imposes enormous requirements on application software that exceed the capabilities of mainframe-centric and traditional client/server technologies. Requirements such as the ability to support heterogeneous environments, multiple languages, multimedia, the Internet and corporate Intranets, and rapid application deployment and upgrades have exceeded the ability of 4GL client/server programming environments. Most organizations are not equipped to build or assemble technologies that overcome this challenge. In addition, a modem application software company must have a product architecture that supports rapid evolution because the requirements of tomorrow's architecture will pass by today's solution.

Along with the technical forces, business drivers such as the total cost of ownership exert influence on the application software architecture. The perfect technical solution will not be chosen if it is too costly to maintain, upgrade, or deploy. The right architecture achieves a balance of all relevant costs to reach the lowest possible total cost of ownership.

An architecture must cultivate user acceptance. The user community will not adopt a fast system with a poor user interface. Nor will they use a system that merely looks good, yet does not truly enhance the business transactions they must perform. The successful architecture is efficient and lean. It minimizes user actions, and conveys information in a manner that is easily understood by all. It is easy to learn, easy to use, and provides real value to its users.

In order to meet these challenges, the key elements of a comprehensive application architecture must include:

Familiar User Interface

Internationalization

Standards Compliance

Upgradability

Complete Development Tools

Configurability

Application Integration Ability

A further challenge for an Internet/Intranet based application or application suite is that according to leading industry analysts, there is an inherent dichotomy in the way that most organizations purchase and deploy application software, exacerbated by poor application architecture. Packaged software applications are typically chosen so that the customer can rely on the software vendor for support, enhancements, and a long term relationship. However, most companies wind up making heavy customizations to the application before they deploy it, then discover that the vendor can't support those customizations. Taking enhancements is prohibitive because doing so would require making the customizations all over again at great expense.

In order to allow companies to customize their applications yet still receive the benefits of upgrades and supports, enterprise applications must provide four critical components:

Comprehensive Development Tools

Published Application Program Interfaces APIs

Complete Metadata Repository

Component Architecture

Additionally, an Internet-based client/server application must be capable of distributing itself widely across the Internet and supporting multiple combinations and configurations.

Specifically, a need exists for an Intranet/Internet based architecture and technology to support the rapid technology changes, including those associated with the Internet, including:

Replacement of the traditional client/server environment

Replacing existing WANs with Internet-based topologies and protocols

The rising popularity of multi-tiered development tools and applications

Rapid changes in software development methodologies

The increased use of software components and objects at all levels

The decline of monolithic desktop applications

The use of smaller and lighter Internet-based client applications

The use of the Internet as a software distribution channel

The use of the Internet to support customers

Requirement for true application data independence

The Internet must support heterogeneous devices and operating systems

The Internet is global and supports multiple languages

The Internet supports content of all kinds (e.g., multimedia, audio, video)

These requirements are necessary to provide an Internet-based client/server application that is capable of distributing itself widely across the Internet and supporting multiple combinations and configurations.

OBJECTS OF THE INVENTION

It as an object of the invention to provide a thin tiered application for the Internet/Intranet characterized in that only the minimum number of logic and data layers, if any, reside on the remote, browser, or client computer and that includes a familiar user interface, that is capable of internationalization, that has a high level of standards compliance, that has ready upgradability and configurability, and application integration ability along with configurability and the capability of providing complete development tools.

It is a further object of the invention to provide an architecture that allows companies to customize their applications yet still receive the benefits of upgrades and supports. This is accomplished through comprehensive development tools, published application program interfaces (API)s, a complete metadata repository, and consistent component architecture.

It is a still further object of the invention to provide capability for distributing itself widely across the Internet and supporting multiple combinations and configurations. This object includes replacement of the traditional client/server environment (including replacing existing WANs with Internet-based topologies and protocols, and support for multi-tiered development tools and applications), the capability of adapting to rapid changes in software development methodologies (including the increased use of software components and objects at all levels, the decline of monolithic desktop applications, the use of smaller and lighter Internet-based client applications, the use of the Internet as a software distribution channel, and the use of the Internet to support customers), and the requirement for true application data independence (where the Internet must support heterogeneous devices and operating systems and multiple languages, and varied content).

SUMMARY OF THE INVENTION

The above objects and other objects are provided by the method and program product of our invention. Specifically, through the use of a metadata repository and a tiered architecture having at least one tier on each computer, and that is instantiated through the contents of the metadata repository, we are able to instantiate an application running on multiple computers, where the application is one having multiple layers. The tiered application is constructed using object oriented programming such that the layers contain objects. The layers also have interfaces to pass data and commands between layers.

In one embodiment of our invention the instantiant data is stored in human readable attribute-value data tables.

In still another embodiment of our invention a program product is provided that contains machine readable program code for instantiating a tiered application using a meta database repository.

THE FIGURES

Our invention may be understood by reference to the Figures appended hereto.

Figure 3:
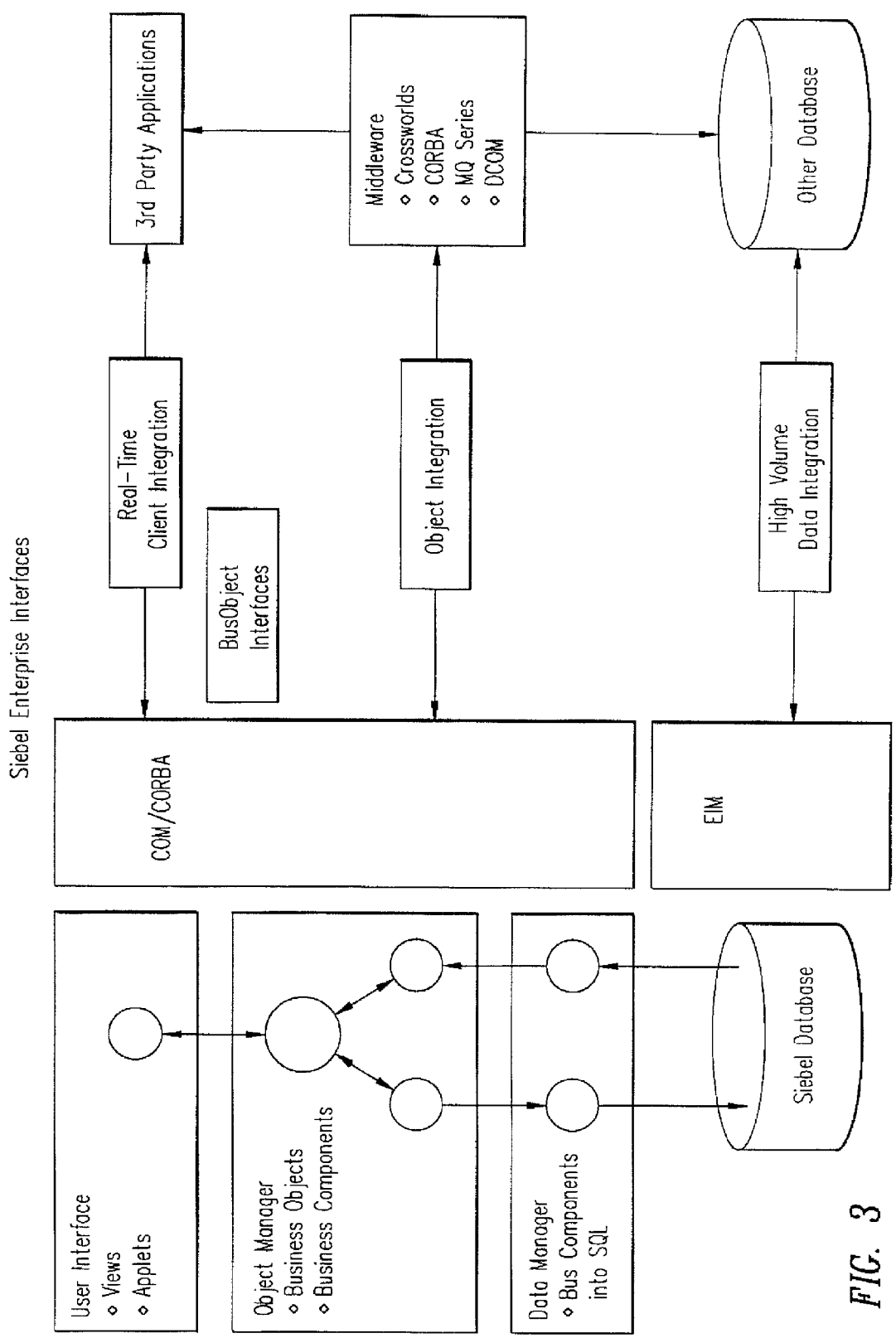

FIG. 3 is an illustration of the interfaces of the three tiered exemplification of our invention, including a user interface with views and applets, an object manager with business objects and business components, and a data manager with business components. These elements interface with a database which may contain vendor and/or customer specific data, with third party applications, with middleware, and with other databases, through a COM/CORBA business object interface, and through EIM.

FIG. 4 is an illustration of the in human readable language of the contents of an object in the metadata repository. To be noted is that while FIG. 3 is in human readable language, the repository entries may not be in human readable form.

DETAILED DESCRIPTION OF THE INVENTION

Our invention is a method and program product for implementing a software application for Internet/Intranet interactions by a plurality of users, through the use of a multi-tiered application instantiated through attribute-value entries in a metadata repository. Specifically, through the use of a metadata repository and a tiered architecture that is instantiated through the contents of the metadata repository, we are able to instantiate an application running on a computer, where the application is one having multiple layers. The tiered application is constructed using object oriented programming such that the layers contain objects. The layers also have interfaces to pass data and commands between layers. In one embodiment of our invention the application is instantiated by extracting attribute-value data from a metadata repository.

In still another embodiment of our invention a program product is provided that contains machine readable program code for instantiating a tiered application using a metadata repository.

Figure 1:
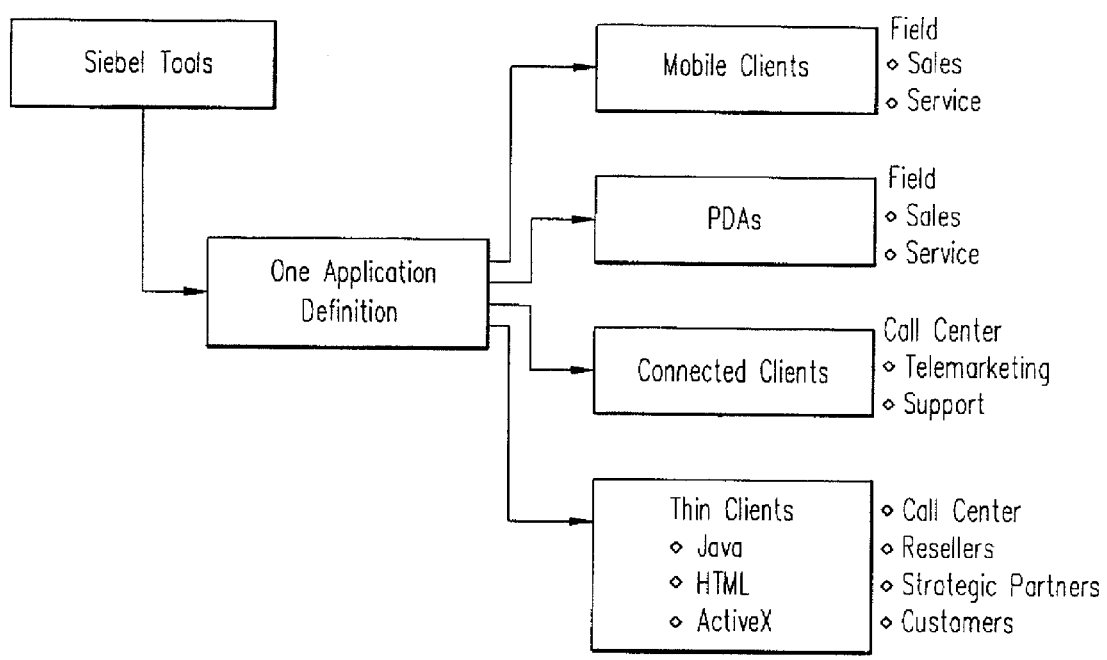
FIG. 1 is a high level overview of the "server" and "clients" of our application, including mobile clients, personal digital assistants, connected clients, and thin clients.

One embodiment of our invention is a method and program product for instantiating a program product to support a distributed sales and/or service organization, as shown in FIG. 1. The instantiated program must support, among others, mobile clients 11, personal digital assistants 21, connected clients 31, and thin clients 41. Mobile clients 11 include field sales 13 and/or service 14 personnel. Likewise, personal digital assistant 21 supported users include field sales 23 and service 25 personnel. Connected clients 31 include, by way of example, call center staff 33, such as telemarketing staff 35 and support staff 37. Thin clients 41 include "internet" and "intranet" supported users, using, for example, Java, HTML, and ActiveX, and are exemplified by Call Center staff 43, resellers 44, strategic partners 45, and customers 46.

Figure 2:
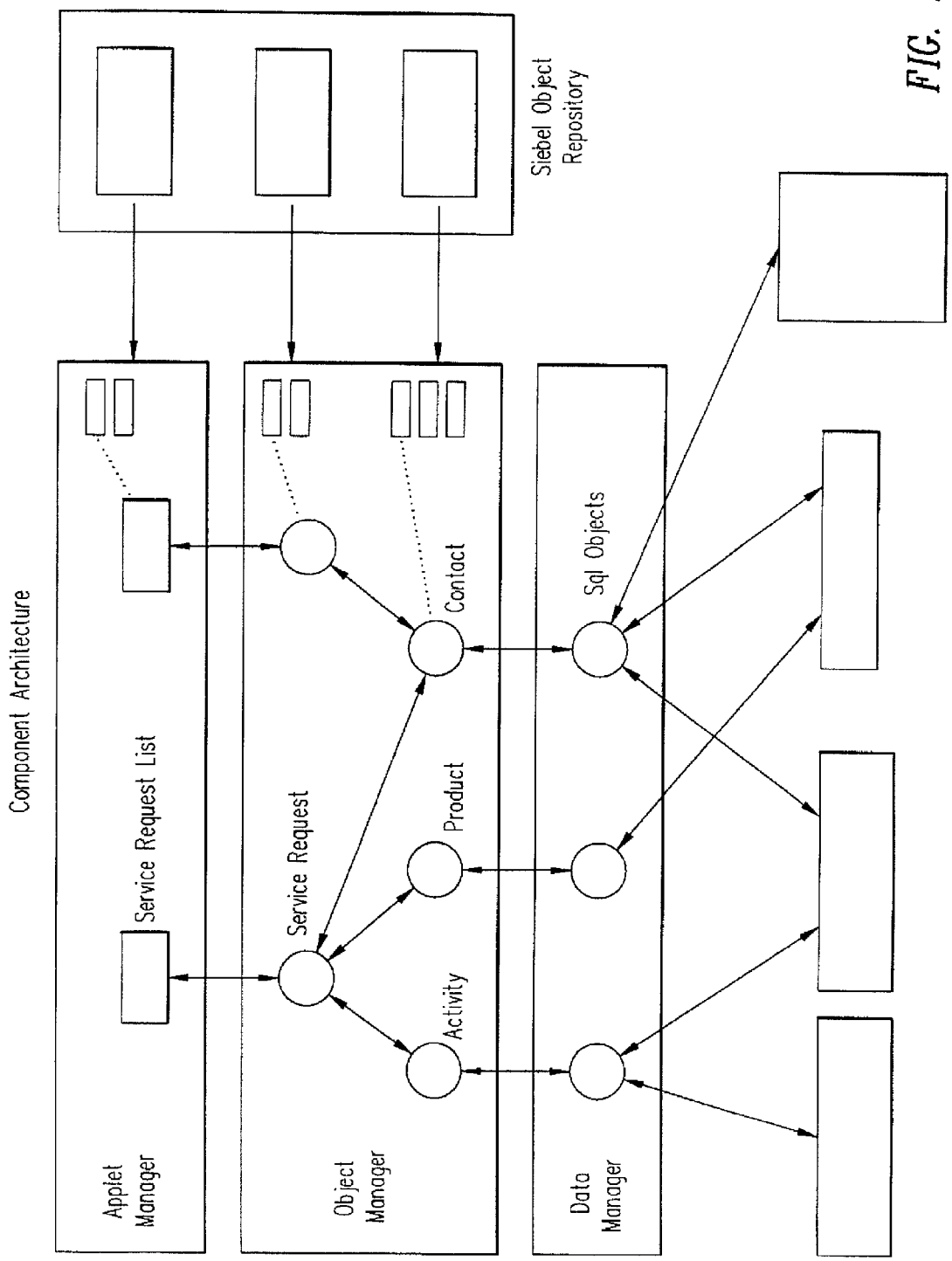
FIG. 2 is an illustration of the component architecture of the three tiered exemplification of our invention, with an applet manager/graphical user interface manager, an object manager, and a data manager, along with an object repository.

FIG. 2 illustrates the architecture of the application. The components are tiered and include an Applet Manager equivalently a User Interface 111, and Object Manager 121, and a Data Manager 131. FIG. 2, which specifically shows the tiered architecture of the components, shows an illustration where a service request list 113 is in the Applet Manager or User Interface 111. The service request list 113 calls a service request 123 in the object manager 121. In turn, the service request 123, calls an activity 125 a product, 127, and a contact 129, which are instantiated by a sets of attributes and values in an object repository 141, as will be described in more detail herein below. To support the activity 125, the product 127, and the contact 129, SQL objects 133 search external databases 151a, 151b, 151c, and 151d.

FIG. 3 illustrates interfaces within the software application, that is, between the tiers 211, 221, and 231. Tier 211 is a User Interface or Applet Manager tier, with views 213 and applets 215. Tier 221 is an object manager, containing the "logic" in the form of business objects 223 and business components 225. Tier 231 is a data manager tier that maps business components into SQL queries. The data manager tier 231 interfaces with both a database 241, and, through EIM, and high volume data integration, with other databases, indicated by 243. Similarly, the User Interface/Applet Manager tier 211, the Object Manager tier 221, and the Data Manager tier 231, communicate with each other through suitable interfaces, which enable each tier to call the other tier's objects, data, and code, and through COM/CORBA and other Business Object Interfaces, indicated as 203, to have real time client integration and object integration with third party applications, 253, and middleware 255, such as Crossworlds, CORBA, MQ Series, and DCOM.

FIGS. 2 and 3 are illustrative of three tiers of the application. More generally, The foundation of the application is based upon an N-Tiered, or multi-tiered, object-oriented architecture.

The purpose of the N-Tiered architecture is three-fold. First, it is the result of a powerful, component-based, object-oriented kernel that has allowed systems developers and engineers to quickly produce a sophisticated yet highly modular system. Second, it provides end users with a platform for rapid application customization while maintaining a clear and consistent upgrade path to future releases of the constituent applications. Third, it provides the architectural foundation to enable a rapid move to the next level of technological requirements that are inevitable due to the forces of the Internet.

The major layers of the N-Tiered architecture include

Applet or user interface layer 111, including an Applet Manager layer (which may be a separate layer also included on the browser or remote client), Business Object Manager layer 121, Data Manager layer 131, and Universal Data Exchange layer 141.

In our invention, at least one layer is solely resident on one computer or platform; for example, in a preferred exemplification one layer, as the user interface layer, is solely resident on a remote client and instantiated thereon Each layer is described in detail below.

1. Applets, Applet Manager, and User Interface Layer

Applet Objects are visual representations of underlying Business Objects that reside in the Business object Manager layer. This layer of the N-Tiered architecture manages the user interaction for applications and components. Applets are created and managed using tools, such as a comprehensive multi-user application customization environment that exploits a visual programming user interface.

These interactive visual components communicate with Business objects through the Applet Manager layer and enable any developer to create customized sales, marketing, and service information system solutions with little or no programming. The Applet layer also extends programs by exposing the interfaces to its applet objects. This allows other programs or objects to control, manipulate, and query the user interface.

Applet Manager

The Applet Manager is responsible for rendering the application user interface and managing the users' interactions. It reads the View object definition from the Repository File, determines the Applets required for the view, then reads the Applet object definitions. The Applet Manager then draws the associated controls and images based on the object definitions.

The underlying purpose of the Applet Manager is to provide a framework for instantiating Applets and to manage the Applet/Business object interaction including execution of the appropriate Business objects methods that are requested by applets and other objects. This is done through the use of the value-attribute pairs shown in FIG. 4.

The Applet Manager enables the Enterprise Applications to be used on a wide variety of platforms because it uses a single Applet definition stored in the repository. An Applet defined to operate in connected mode can just as easily be used in a mobile mode. Using the Applet Manager delivered with the Thin Client, the same Applet can be deployed in either the Windows Thin Client or as an Applet in the Java Thin Client. If appropriate, the very same Applet can be similarly rendered in the Hand Held Client, without additional programming. This architecture enables application user interface objects, including views and Applets, to be configured once in the repository and deployed in many environments.

The Applet Manager must exhibit high performance and scalability across all platforms that it supports. The Applet Manager accomplishes this by effectively managing the communication between itself and the Business object Manager layer, and by being efficient in the way that it renders application views.

The Applet Manager minimizes the amount of data that must be transferred between itself and the Business object layer to ensure highly efficient communication. The Applet Manager uses caching to enable reuse of data that has already been retrieved from the Object Manager layer, so that the same data does not have to be transferred multiple times. The Applet Manager uses this and other techniques to make very large deployments of the Enterprise Application scalable to thousands of users on a LAN, as well as scalable to thousands over the Internet.

The Applet Manager is also very efficient in the way it renders views in the application. The Applet Manager renders the views, applets, and other objects on an on-demand basis. This means that a particular object, the Account View for example, is not rendered until the user navigates to that view. This technique allows the Applet Manager to consume far less memory than programs that statically define all of the screens and views in the code of the program itself.

The Applet Manager is also configurable and extensible. For example, it may use an event model for VB that enables users and integrators to add new visual components to the user interface and create handlers for specific events that occur through the interaction of the user with these visual objects. When an event occurs, the Applet Manager intercepts the event and executes the appropriate event handler written in VB.

2. Business Object Manager

Business objects are programmable and accessible through Business Objects Interfaces and can be used in many ways that closed systems cannot provide. These include serving as components of user-defined light clients, ultra-light clients, clients written in languages such as Microsoft Visual Basic or Sybase Powerbuilder, and Webpage clients. The Business Object Layer is resident on the server in the system, method, and program product of our invention.

This approach opens significant business opportunities for independent developers and users. They can easily create third-party applications and add-ons to Sales Enterprise and Service Enterprise or access specific Business objects and their corresponding applets to create other applications.

The Business Object Manager provides for consistent object behavior and interaction of all business objects (Business objects) within Enterprise Applications. Business objects are highly configurable, object-oriented building blocks of Enterprise Applications. The family of Business objects is extensive and includes Opportunity, Account, Customer, Product, Competitor, Campaign, Service Request, and Product Defect, to name a few. Business objects contain the business logic for the component as well as semantic information about the sales, marketing, and service entities. Highly configurable via Tools, Business objects are designed to allow organizations to rapidly configure the application to meet their business requirements while ensuring a clear and consistent upgrade path for future releases.

The Business object Manager also uses row buffers, so that only the first few rows of a multi-row query are actually returned to the client. This enables the user to see the results of the query without having to wait for all rows to be transferred to the client and enables this layer of the N-tiered architecture highly scalable.

3. Data Manager

The Data Manager is a layer in the architecture that maintains an object-oriented abstraction of the native data stored in the data repositories for the benefit of the Business Object Manager. The Data Manager layer is resident on the server. This abstraction of the physical database schema frees developers from the constraints of the physical data layout while providing data access and manipulation in an effective, efficient manner.

Traditional approaches rely on the developer's personal knowledge of SQL and the database schema to access and maintain data. These approaches are prone to error, and often result in poor and uneven performance. While SQL basics are relatively easy to learn, good SQL is difficult to master. The reliance on developers then to know the entire database schema, with the individual nuances of each implementation, is a risky prospect.

In contrast the Data Manager relieves developers from ever having to code SQL in the Enterprise applications. Business components are mapped to their data sources in the Tools repository. At run time the Data Manager creates SQL Objects that in turn generate the SQL necessary to deliver the appropriate data.

In addition to being much less error-prone than their hand-coded counterparts, SQL Objects are fined tuned to the specific Applet from which they are called, enabling them to be much more efficient about which data elements are actually retrieved. Applets contain controls that are in turn mapped to Business component fields. The Business components in turn communicate to the Data Manager the list of fields that are required to be displayed or updated. The SQL objects dynamically construct an efficient SQL statement to retrieve or update the data appropriately.

In contrast, many 4GL programmers hard-code the SQL in such a way as to try and make the SQL re-usable. This is a concession to the fact that good SQL is difficult to write, so programmers try on their own to minimize the occurrences of it. However, this leads to SQL statements that are overly general and that retrieve more data than a given use may require.

Universal Data Exchange

It is valuable to support multiple data sources for the Business objects and the applets that represent them. This is the responsibility of the Universal Data Exchange Layer. It sits at the lowest tier in the N-Tiered architecture and does the following:

It understands the nature of the raw data as it is stored and represented in the repository It supports multiple data repositories, including relational database management systems, on-line analytical processing, and others It is able to deliver data from these data sources upward to the Data Manager Layer in a consistent, efficient manner, and It understands and uses the optimal method of data retrieval for different sources.

The Universal Data Exchange layer is the part of the architecture that binds the Enterprise Application components to the specifics of the particular data source being used. This layer is responsible for translating general SQL statements into ones that are specific and well-tuned for the actual target database.

For example, the Oracle database optimizer works backwards on SQL statements when processing, so that when working with large tables, it is usually preferable to specify the largest table involved in the query at the end of the "From" clause. Conversely, in Sybase's optimizer, the sequencing of the tables works differently, and using the same approach as on Oracle may lead to sub-optimal performance. The Universal Data Exchange layer manages these differences so developers need not concern themselves with these idiosyncrasies in order to configure a good application.

The Universal Data Exchange layer also manages the differences between the API's of the various data sources. If Oracle is the back-end database, then the Universal Data Exchange Layer will use the Oracle Call Interface (OCI) to connect directly to SQL*Net, Oracle's most efficient API. If another database is used, the Universal Data Exchange Layer automatically converts to that database's native interface guaranteeing the most efficient data connection possible.

N-Tiered Architecture Benefits

The N-Tiered architecture with one tier or layer on the remote or networked platform is extremely powerful and offers significant advantages as the basis for the product architecture of Enterprise Applications.

The N-Tiered Architecture offers:

Significantly improved performance and scalability. It allows developers to create the optimal sales, marketing, and service information system configurations.

Easier maintenance. It allows developers to configure Business object definitions stored in one central Business object repository. This controls the behavior and information access properties of Business objects that provide shared services to clients.

Reduced development time. It enables developers to assemble new applications and utilities from existing software components with a minimum of development time.

Higher quality. It provides an open architecture with registered, industry-standard object interfaces so that automatic testing of all tiers is easy and reduces the manual testing required.

Smaller footprint devices. It allows developers to dynamically download the user interface so that small, memory-limited hand-held devices can execute applications by downloading only the required applet.

Business opportunities. It enables developers to create third-party add-ons to Enterprise Applications and license components of Enterprise Applications to build new applications.

Meta Data Repository

Objects are managed in the Repository, a single integrated datastore of all the information required for defining a Enterprise Application. The Repository provides a complete multi-user application customization platform that supports check-in and check-out, version control, and automatic application upgrades. As noted above, FIG. 4 is an illustration, in human readable language, of the contents of an entry in the metadata repository.

Metadata, data that defines the structure and order of other data, is an important aspect of application architecture that leads to a variety of cost of ownership issues. The metadata repository contains properties and attributes (as property-attribute pairs relating to the business componet, e.g., contact, account, etc. as well as the applets used by the application) that determine the behavior of tiers or layers, applets, and objects. The use of metadata enables the automatic upgrade capability, while ignoring the metadata repository almost precludes automatic upgrades. This is because structured metadata allows for automated analysis and manipulation and for upgrades without changing the underlying source code. Traditional 4GL programming languages do not contain the structure necessary for automated analysis, so comparison of two versions is a manual process.

Well defined metadata repositories can significantly reduce the cost and time required to train new developers sufficiently to customize an application. Graphical development tools like Siebel Tools allow new developers the ability to easily configure an application without the need to learn a procedural language. Alternative proprietary programming languages offer steep learning curves that lengthen the time it takes to configure and then deploy an application.

Business Object Repository Manager

The Business Object repository manager provides application developers with an efficient multi-user development environment that includes access to check-in/check-out functionality and version control. In a typical development environment, a Server Repository contains the master application definition. Each developer on the team has a Local Repository to which Tools connects. The various object definitions in the Business object Repository are grouped into Projects. Developers can lock Projects, check them out from the Server Repository, and move them into their Local Repositories to make changes to the object definitions. This method prevents other developers on the team from modifying the same Project. Once a developer has made changes and tested them, the Project can be checked back into the Server Repository. Before checking in a Project, the developer can review the changes that have been made, thereby minimizing check-in errors. The check-in/check-out process can be integrated with an external version control system such as Microsoft Visual SourceSafe, PVCS, or ClearCase, allowing the development team to maintain a version of all changes made to the repository.

Business Object Compiler

Another aspect of our invention is a Business Object Compiler. The Business Object Compiler allows developers to compile the repository or projects, either completely or incrementally, significantly speeding the development cycle of any project. The compiler generates a Repository File that is used to instantiate and run the Application.

Visual Basic

The VB development environment provides application developers with a complete Microsoft Visual Basic programming platform for integrating Enterprise Applications with third-party cooperative applications and extending the base functionality of the application screens and Business Components. VB is a complete Visual Basic-compliant environment that includes an editor, a debugger, and an interpreter/compiler that allows application developers to extend and further configure applications. This capability is integrated with the Applet Designer, so developers can attach scripts to user interface element controls such as buttons, fields, and ActiveX controls. Developers also can further configure Business Component behavior by using VB.

Object Interfaces

Not only can application developers extend applications with VB but they also can use Object Interfaces to access data from third-party applications, provide integration with legacy systems, and automate applications from other external applications. This allows developers to extend application behavior, provide client-side integration to other applications, and enable access to data and business rules from other environments. Object Interfaces expose selected objects through a set of general purpose interfaces that can be accessed from custom routines external to the applications. Object Interfaces are available in various technologies including COM, Active X, and CORBA. Developers can access these interfaces using a wide variety of programming languages and environments such as Microsoft Visual Basic, Microsoft Visual C++, PowerBuilder, and Java.

Database Extension Designer

For developers who require extensions beyond built-in database extensions, Database Extension Designer provides a point-and-click interface for extending application tables. Developers can use these database extensions to capture data from new fields in application screens or from external sources using the Enterprise Integration Manager.

The Database Extension Designer is integrated with the Business object Repository and allows developers to make one set of changes, reflecting the appropriate visibility rules for database extensions. It then automatically triggers updates to Remote and Anywhere.

Business Object Explorer

A further aspect of our invention is the optional provision of a Business Object Explorer. This is a graphical editing tool for modifying and managing object definitions. It comprises a hierarchical Object Explorer, which allows developers to browse the various Object types; an Object List Editor, for viewing and editing object definitions; and a Properties window, for editing object property values. The Business object Explorer also includes a Windows-style Find capability that allows developers to quickly locate objects in the repository, which stores all object definitions.

Object Visualization Views

Object visualization views provide graphical representations of the relationships between the various object definitions in the Business object repository that help simplify the configuration process. A typical Enterprise Application configuration contains thousands of objects. Developers can use these views to understand the object hierarchies and navigate through them. Then, using the editing tools, they can modify the properties of these objects. These views help them assess the impact of these modifications and track down configuration errors. The Visualization Views can be printed and used as a valuable reference during configuration. The figure below shows the details of a Business Component definition.

Applet Designer

Another aspect of our invention is the optional provision of an applet designer. This is an intuitive drag-and-drop visual programming interface for modifying and extending list, form, dialog, and chart user interface objects (applets). These objects can be populated with standard Windows controls including buttons, combo boxes, check boxes, labels, and text fields, as well as ActiveX controls. The Applet Designer leverages the familiarity of developers with popular graphical application development tools such as Microsoft Visual Basic. The controls can be configured with the Properties Window and scripted with the integrated VB editor. The Applet Designer also helps ensure visually accurate and correctly translated configurations by providing a design-time preview of the applet in a variety of screen resolutions and under various language settings.

View Designer

An optional view designer application allows developers to visually modify existing Views and construct new ones by simply dragging and dropping the desired applets onto the View canvas. No additional specification or code is required for defining the relationships between the applets. Most other application customization tools require developers to write significant amounts of code to achieve this same functionality. This code has to be replicated for every screen in the application, an inefficient and error-prone process.

Menu Designer

An optional menu designer gives developers a visual metaphor for customizing and extending menu structures.

New Object Wizards

New object wizards assist developers in the creation of new objects in the repository. Some examples of Wizards are the Form Applet Wizard, Chart Applet Wizard, List Applet Wizard, and Business Component Wizard. Users click on the type of new object they want to create, and the Wizard guides them through the entry of properties that type of object requires.

Application Integration

The instantiation process of our invention from a metadata repository provides application program interfaces to third party applications. The metadata repository contains attribute-value pairs as shown in FIG. 4. To be noted is that the actual entries are in code that is not human readable, but the entries are reproduced here in human readable form. A fact of life in almost every company today is that there are multiple applications that people use. And, users want these applications to work together as if they were one. This is challenging given that so many applications were never designed to integrate and there are so many different application technologies and designs.

The architecture is designed with the requirement for integration as an integral feature. provides a complete application programming interface (API) for accessing the business objects through standard protocols including COM and CORBA. These interfaces provide real-time access to the objects, and allow external programs to share and transfer data between their own local stores and the instant application. In addition, provides a server based application integration utility for bi-directional transfer of even the largest volumes of enterprise data between and other enterprise data stores. Both technologies come standard with the enterprise applications, and allow for unprecedented application integration at minimal cost.

The Object Interfaces provide complete access to all of the power of the objects, with a simple, easy to understand set of events and methods. The interface is modeled after the way end users access the application, and provides access to the same functions via COM or CORBA calls. For example, when a sales professional wants to access contact information, they navigate to the contact screen and click the "Enter Query" button to specify a query. Then they will click the "Execute Query" button to cause to access the appropriate data and display it on the screen.

Similarly, developers may want to allow access to the same information from another application. For example, a credit verification application may need to access the contact information stored in the database of the present application. To accomplish this, the credit application follows the same basic steps as the end user. First, the credit application "navigates" to the desired object by issuing a "GetObject" method. This happens automatically when the user clicks on the "Contact" tab in the application. Next, the credit application issues a "SetQuerySpec" method which is the equivalent to the end user's pressing the "Enter Query" button. The credit application then issues an "ExecuteQuery" method, and retrieves the desired information.

Data Independence of Distributed Applications

In the world of the Internet and distributed applications, data comes from many sources. Structured data will continue to come from relational databases. However unstructured data will increasingly come from datastores such as multimedia servers or object-oriented database management systems (OODBMSs) and syndicated data sources such as Individual, Inc., Reuters, and others. An example of this ability to seamlessly integrate various data sources is seen in the Interactive product.

Application Program Interfaces and Application Program Interface Requirements

Large organizations require increasingly integrated business applications that are quickly adaptable to evolving business needs and to global competition. These environments are composed of modem best-of-class software packages as well as aged legacy mainframe applications which have to be interconnected through a set of well-structured interfaces.

Batch Interfaces, which allow organizations to share large volumes of information between the customer information system and other enterprise applications. These interfaces need to support full transaction control to replicate enterprise information including accounts, products, prices, employees, territories, and organizations between systems. These interfaces need to be scaleable to handle large volumes of data and need to be upward compatible with new software releases. Transactions made via these interfaces must be seamlessly synchronized to mobile users and regional servers.

On-line Interfaces, which enable organizations to share transaction information between enterprise applications in real time. These on-line interfaces should be based on a common, open inter-application standard such as COM/DCOM and CORBA. This allows organizations to leverage cross-vendor industry advances and increases the number of applications that can be seamlessly integrated with the customer information system. In addition, On-line Interfaces, like Batch Interfaces, should be upward compatible, allowing for the seamless migration from release to release of enterprise application software.

Web Interfaces, which enable organizations to expand their existing branded web site to display and capture enterprise application data for e-commerce applications, while preserving their establish style and look and feel.

Pre-Built Interfaces, which provide a set of predefined and prepackaged interfaces to market leading accounting, manufacturing, distribution, human resource, and product configuration applications. These pre-built interfaces enable rapid application deployment and reduce overall application maintenance.

Interfaces

The application of our invention provides users with a comprehensive enterprise application integration solution that meets all the above requirements through a suite of product and service offerings.

The Object Interfaces

The Object Interfaces are the technology foundation for on-line real time integration with legacy desktop, web-based, server-based, and mainframe-based legacy applications. These Object Interfaces are well-defined, open, customizable, and upgradable on-line interfaces to the Objects at the client and application server levels.

The exposed types of objects are:

Application Object Types: the Application Control and the Data Control

The application objects represent the application as a whole, with its GUI (application control) or without the GUI (data control). These objects contains the properties and methods that interact with the software as a whole, and provides the means to easily embed a applications into an existing legacy applications.

Business Object Type

Business Objects are highly customizable, object-oriented building blocks of applications. They define the relationships between different business component objects (Business components), and contain semantic information specific to each one, for example about sales, marketing, and service-related entities. These objects provide the mean to integrate an existing legacy application into a application.

Business Component Object Type

A business component defines the structure and behavior of a particular entity, such as an opportunity, a quote, or a product. These objects provide the means to integrate an existing legacy application into a application.

Applet Object Type

A applet is a container for user interface objects, including controls that together make up the visible representation of a business component. Applets can be used to embed legacy GUI components, such as an ActiveX component, to implement client side integration.

User Interface Control Object Type

A user interface control object is a visual object with which the user can directly interact.

Application Factory Object Type

This object provides access to data objects from an external application in a CORBA environment.

The Object Interfaces include:

COM Interfaces

These interfaces exposes object interfaces within the application (Siebel VB), or from an external programming language (Siebel COM Data Server and Automation Server). This technology provides for external application integration within the same server. This technology is for example used to integrate third party report generator.

ActiveX Interfaces

The ActiveX interfaces enable external applications to access Business Objects across a network. There are two such interfaces: ActiveX Data Control, and the Application Control. The data control gives access to all the non-GUI objects, whereas the application control includes access to all the GUI objects.

CORBA Interfaces

CORBA Interfaces enable external applications to access Business Objects through CORBA using Inprise's or Iona's ORBs. The set of interfaces exposed is similar to that of the ActiveX Data Control, and can be used by any external application to read and write data without having to display Siebel's user interface.

HTML Tags tags are a set of predefined HTML tags to enable the integration of data into an enterprise Web site, while enabling the web site to keep its own branding.

Siebel Enterprise Integration Manager (EIM)

EIM provides for batch interfaces for highly efficient data integration with external applications. EIM supports bi-directional exchange of large volumes of transaction and event data through pre-built and extensible interface tables.
Siebel Pre-Built Interfaces.

The Pre-built Interfaces provides for out-of-the-box enterprise scaleable of the applications with two major ERP vendors, PeopleSoft and SAP.
Extensible Interfaces object and interface definitions are fully extensible to accommodate the individual requirements of customers. All object and interface definitions are stored in the Repository, and are extensible using Tools. Interface extensions are preserved across upgrades using the same object upgrade technology utilized for business object definitions.

Third Party aware middleware integration tools. These third tools are available through third parties, such as alliance partners, for the development of high-end custom cross-application process integration.

The architecture exposes its objects as components under both of the two industry standards for object technology: Microsoft COM and OMG CORBA. In addition, predefined and configurable Interface Tables provide for high-throughput integration of cross-application data, events, and transactions. This means unprecedented flexibility with regard to application integration across all vertical industries-including the telecommunications, financial services, and pharmaceutical industries-where both of these standards have captured mindshare as ways to unify the entire enterprise.

Configurable, Customizable, Upgradable Interfaces

The architecture described herein is repository-driven. All applications run from the same executable. Each application is defined by data stored in the repository. An application is started by the launch of the single executable to interpret the data stored in the repository for that application. The executable spawns the defined business objects and applets as needed and enforces the repository-defined business processes and rules.

Every application is functional out-of-the box. Customization involves changing the repository with Tools. Applets, business objects, and schema can be configured through data to best match the models already implemented in legacy applications. Missing applets and business objects needed for integration with legacy applications can be created by data addition to the repository.

Object interfaces are also defined through the repository. Business objects can be customized via data changes in the repository and scripting with VB, allowing their adaptation to existing external models.

Object Interfaces

Object Interfaces provide the foundation for seamless, maintainable, bi-directional, and on-line interfaces between the Enterprise Applications and the multitude of third party, legacy, and custom-built applications prevalent in enterprise relationship management deployments. Object Interfaces expose multiple classes of objects as industry-standard COM and CORBA objects, as well as to Web servers through HTML tags, and provide for a complete set of methods for manipulating those objects access to the following classes of application objects:

Logic Objects, which include data as well as application logic. Logic Objects are either business objects or business component objects. A business component models a single entity such as an address, or a contact, whereas a business object is a set of business components linked by relationships.

User Interface Objects (UI Objects, for short), which perform data presentation services. UI Objects are either applet objects, User Interface Control Objects, and application objects.

Object Interfaces are divided into families, according to the technology standards with which they interoperate:
COM Interfaces
ActiveX Interfaces
CORBA Interfaces
HTML Tags
Siebel COM Interfaces The COM Interfaces provide a Microsoft Common Object Model interface to both Logic and UI Objects and can be driven from a client or be driven by other applications.

COM Object Interfaces can be accessed in three distinct ways:

From within the application through VB. VB is a complete, procedural programming language that allows you to write custom extensions that access and control objects via the Object Interfaces.

From an external programming language, such as Microsoft Visual Basic or Java, without displaying the user interface. This mode of operation is through the COM Data Server. This interface can be used by any external application, hosted in the same server or desktop, to access applications for both reading and writing.

From an external programming language, but with access to user interface. This mode of operation is through the COM Automation Server. This interface can be used by any external application, hosted in the same server or desktop, to access applications for both reading and writing.
ActiveX Interfaces The ActiveX interfaces enable external applications to access Objects across a network. The ActiveX Data Control provides access to the Logic Objects. The ActiveX Application Control includes access to the user interface. In either case, access is through the Object Manager, a multithreaded, multiprocess application server that supports session-based connections by clients. The server can be replicated for scalability, with automated load balancing to ensure maximum overall performance.
CORBA Interfaces The CORBA Object Interfaces expose Logic objects only, operate on a Server, and can only be driven by external applications. CORBA Object Interfaces are implemented through the CORBA Object Manager. The CORBA Object Manager supports the Inprise's Visibroker and the IONA's Orbix ORB.
HTML Tags The HTML Object Interfaces give industry-standard Web servers access to Logic Objects through HTML Tags. HTML Tags operate against the Object Manager and the Web Server.
Configurable Objects Configurable Objects to allow organizations to configure Enterprise Applications to fit their unique needs. Examples of Objects include Opportunities, Quotes, Forecasts, Service Requests, and Products. These Objects are built with the latest object-oriented application development technologies from Microsoft Corporation, such as MS Visual C++, MFC Libraries, and Component Object Model (COM/DCOM/OLE 2).

While our invention has been described with respect to certain preferred embodiments and exemplifications, it is not intended to limit the scope of the invention thereby, but solely by the claims appended hereto.

We claim:

1. A program product having machine-readable program code for establishing a multi-layered, object-oriented software application, comprising:

an object repository containing a plurality of object attributes and definitions, along with associated values;

a data manager layer connected to the object repository, running on a first computer and operable to maintain an object-oriented abstraction of data within the object repository;

an object manager layer connected to the object repository and the data manager layer, running on the first computer and operable to maintain a plurality of business objects, wherein the plurality of business objects are organizable into projects and wherein the projects can be locked, checked-out, or checked-in;

an applet manager layer running on at least two computers separate from the first computer and operable to maintain a plurality of user-interface objects including applet objects, wherein each of the layers contains at least one interface for communications between the layers, a user, or an external application, and further wherein the object repository contains an executable file for instantiating the user-interface objects in accordance with their corresponding attributes, definitions and values whenever a user of at least one of the two separate computers utilizes the user-interface objects.

2. The program product of claim 1, wherein one of said at least one interface is an application programming interface by which third-party application access the business objects through standard protocols.

3. The program product of claim 1, wherein the applet manager layer further comprises:

applet objects having applet object definitions stored in the object repository and representing interactive visual components for interfacing with a user; and view objects having view object definitions stored in the object repository, wherein the applet manager layer reads the view object definition to determine which applet objects are required in response to a user view request, reads the applet object definitions and instantiates the applet objects to thereby draw associated interactive visual components based on the applet object definition and compatible with a one of the two separate computers running the instantiated applet objects.

4. The program product of claim 3, wherein the applet manager layer manages interactions between the applet objects and the business objects based on the object attributes, definitions and values stored within the object repository.

5. The program product of claim 4, wherein the business objects are mapped to their data sources in the object repository, and further wherein the data manager layer creates SQL objects that in turn generate the SQL necessary to deliver appropriate data to an applet object calling for the data from the repository through the business object.

6. The program product of claim 5, wherein the SQL objects dynamically construct an efficient SQL statement to retrieve or update the data appropriately.

7. The program product of claim 6, further comprising a plurality of data bases in addition to the object repository to which the data manager layer has access.

8. The program product of claim 7, further comprising a universal data exchange layer operable to translate the SQL statement into compatible SQL statements with one of the plurality of databases from which data is obtained.

* * * * *